(12) United States Patent
Lalaoua

(10) Patent No.: US 9,789,351 B2
(45) Date of Patent: Oct. 17, 2017

(54) MULTI-PURPOSE ABDOMINAL AND CORE EXERCISE MACHINE

(71) Applicant: Nabile Lalaoua, Las Vegas, NV (US)

(72) Inventor: Nabile Lalaoua, Las Vegas, NV (US)

( * ) Notice: Subject to any disclaimer, the term of this patent is extended or adjusted under 35 U.S.C. 154(b) by 0 days.

(21) Appl. No.: 15/265,791

(22) Filed: Sep. 14, 2016

(65) Prior Publication Data

US 2017/0014678 A1 Jan. 19, 2017

Related U.S. Application Data

(63) Continuation-in-part of application No. PCT/IB2016/054191, filed on Jul. 13, 2016, which is
(Continued)

(51) Int. Cl.
*A63B 23/02* (2006.01)
*A63B 21/00* (2006.01)
(Continued)

(52) U.S. Cl.
CPC ......... *A63B 21/4045* (2015.10); *A61H 15/00* (2013.01); *A63B 21/0552* (2013.01); *A63B 21/4034* (2015.10); *A63B 21/4035* (2015.10); *A63B 23/0211* (2013.01); *A63B 23/03525* (2013.01); *A61H 2015/0014* (2013.01); *A61H 2201/0161* (2013.01); *A61H 2201/1261* (2013.01); *A61H 2201/1284* (2013.01); *A61H 2201/1604* (2013.01); *A61H 2201/1623* (2013.01); *A61H 2201/1635* (2013.01); *A61H 2201/1669* (2013.01); *A63B 21/00065* (2013.01); *A63B 21/0442* (2013.01); *A63B 21/072* (2013.01); *A63B 21/154* (2013.01); *A63B 21/4003* (2015.10); *A63B 21/4033* (2015.10); *A63B 21/4049* (2015.10); *A63B 22/0087* (2013.01); *A63B 22/20* (2013.01);
(Continued)

(58) Field of Classification Search
None
See application file for complete search history.

(56) References Cited

U.S. PATENT DOCUMENTS 4,757,993 A * 7/1988 Rake ...................... A63B 21/04
482/112
6,971,977 B1 * 12/2005 Chen ................... A63B 21/0552
297/258.1
(Continued)

*Primary Examiner* — Stephen R Crow

(57) ABSTRACT

A multi-purpose abdominal and core exercising machine is an apparatus that allows a user to exercise their abdominal muscles through a variety of guided movements. The apparatus includes an incline-adjustable frame, a track, a swiveling seat, a height-adjustable headrest, a first graspable pole, a second graspable pole, and a backrest. The track is mounted onto the incline-adjustable frame. The backrest and the swiveling seat supports the user's body as the backrest slides along the track and the swiveling seat is terminally fixed to the track. The height-adjustable headrest is mounted between the two grasping poles. The proximal end for each grasping pole is rotatably connected to the backrest, which allows the user to hold the distal end for each grasping pole. Pulling the grasping poles towards the user's abdomen allows for a movement by the apparatus to exercise the user's abdominal muscles.

13 Claims, 5 Drawing Sheets

Related U.S. Application Data a continuation-in-part of application No. 15/204,863, filed on Jul. 7, 2016, now Pat. No. 9,744,401, application No. 15/265,791, which is a continuation-in-part of application No. PCT/IB2016/005542, filed on Sep. 12, 2016, which is a continuation-in-part of application No. 15/258,047, filed on Sep. 7, 2016, application No. 15/265,791, which is a continuation-in-part of application No. PCT/IB2016/053903, filed on Jun. 20, 2016, which is a continuation-in-part of application No. 15/187,564, filed on Jun. 20, 2016, application No. 15/265,791, which is a continuation-in-part of application No. PCT/IB2016/054213, filed on Jul. 14, 2016, and a continuation-in-part of application No. 29/577,628, filed on Sep. 14, 2016, and a continuation-in-part of application No. 15/265,768, filed on Sep. 14, 2016.

(60) Provisional application No. 62/283,840, filed on Sep. 14, 2015, provisional application No. 62/231,629, filed on Jul. 13, 2015.

(51) Int. Cl.
| | | |
|---|---|---|
| *A63B 21/055* | (2006.01) | |
| *A63B 23/035* | (2006.01) | |
| *A61H 15/00* | (2006.01) | |
| *A63B 21/04* | (2006.01) | |
| *A63B 21/072* | (2006.01) | |
| *A63B 22/00* | (2006.01) | |
| *A63B 22/20* | (2006.01) | |
| *A63B 23/12* | (2006.01) | |
| *F16B 7/10* | (2006.01) | |
| *A63B 23/00* | (2006.01) | |

(52) U.S. Cl.
CPC ..... *A63B 23/0216* (2013.01); *A63B 23/03541* (2013.01); *A63B 23/1209* (2013.01); *A63B 2022/206* (2013.01); *A63B 2023/003* (2013.01); *A63B 2023/006* (2013.01); *A63B 2208/0204* (2013.01); *A63B 2208/0228* (2013.01); *A63B 2210/50* (2013.01); *A63B 2225/09* (2013.01); *A63B 2225/093* (2013.01); *F16B 7/10* (2013.01)

(56) References Cited

U.S. PATENT DOCUMENTS

| | | | | |
|---|---|---|---|---|
| 7,976,445 | B2* | 7/2011 | Lalaoua | A63B 21/0552 482/121 |
| 8,721,510 | B2* | 5/2014 | Chung-Ting | A63B 21/015 482/132 |
| 8,876,676 | B2* | 11/2014 | Lalaoua | A63B 71/023 482/123 |
| 2015/0105228 | A1* | 4/2015 | Lalaoua | A63B 23/0205 482/142 |
| 2015/0202484 | A1* | 7/2015 | Lalaoua | A63B 21/025 482/127 |
| 2017/0014677 | A1* | 1/2017 | Lalaoua | A63B 21/023 |
| 2017/0014678 | A1* | 1/2017 | Lalaoua | A63B 21/0552 |
| 2017/0014679 | A1* | 1/2017 | Lalaoua | A63B 23/0222 |
| 2017/0106227 | A1* | 4/2017 | Lalaoua | A63B 21/4035 |
| 2017/0216649 | A1* | 8/2017 | Lalaoua | A63B 21/0407 482/130 |
| 2017/0216659 | A1* | 8/2017 | Lalaoua | A63B 21/4047 482/128 |

* cited by examiner

MULTI-PURPOSE ABDOMINAL AND CORE EXERCISE MACHINE

The current application claims a priority to the U.S. Provisional Patent application Ser. No. 62/283,840 filed on Sep. 14, 2015.

FIELD OF THE INVENTION

The present invention relates generally to exercise equipment. More specifically, the present invention is a multi-purpose abdominal and core exercise machine which allows a user to build a strong and defined middle section. The present invention utilizes body weight to enable a user to perform a crush-like exercise which effectively targets the abdominal and core muscle groups. Additionally, the present invention also includes a variety of additional integrated exercise equipment that allow the user to perform a full body workout.

BACKGROUND OF THE INVENTION

Exercising core muscles is a common way to stay physically fit. Specific exercises that target core muscles, including sit-ups, crunches, and planks can be useful for strengthening abdominal muscles but can also lead to injuries. Further, performing such exercises on hard surfaces can prove to be uncomfortable. Existing workout devices or machines typically move in one direction. This limits the number of exercises a user can perform. Further, repeatedly performing the same exercises can lead to decreased results when compared to varying exercise routines.

Accordingly, there is a present need for an exercise machine capable of comfortably and safely supporting a user through the performance of various abdominal exercises. The present invention is an abdominal exercise device that supports users while performing a crunch-like exercise on the present invention in order to strengthen core muscles. The present invention uses a guide track to provide the user with the ability to engage the lower and upper body in a repetitive matter. Additionally, the present invention includes a multitude of alternative configurations which allow the user to further execute a full body workout. Traditional exercise equipment which provide the aforementioned benefits are usually found in gyms as they are large and heavy. The present invention utilizes a minimalistic foldable frame in order to allow the user to store and utilize the present invention at home with ease and comfort.

DETAIL DESCRIPTIONS OF THE INVENTION

All illustrations of the drawings are for the purpose of describing selected versions of the present invention and are not intended to limit the scope of the present invention.

The present invention is an exercise device that allows a user to efficiently engage and strengthen his or her abdominal and core muscles. This is achieved through the use of a curved track which guides the user to perform a crunch-like exercise at an elevated height and an angled orientation. This position and orientation forces the user to engage and contract the abdominal and core muscles simultaneously. Additionally, the present invention also provides a multitude of additional exercise features to allow the user to target additional muscle groups of the body, thus achieving a full body workout. Type of exercises that may be performed using the present invention include, but are not limited to, power abdominal crunches, abdominal crunch twists, cross over crunches, leg raises, and leg raises with a twist. Furthermore, the present invention utilizes a collapsible mainframe in order to allow for easy storage.

Figure 1:
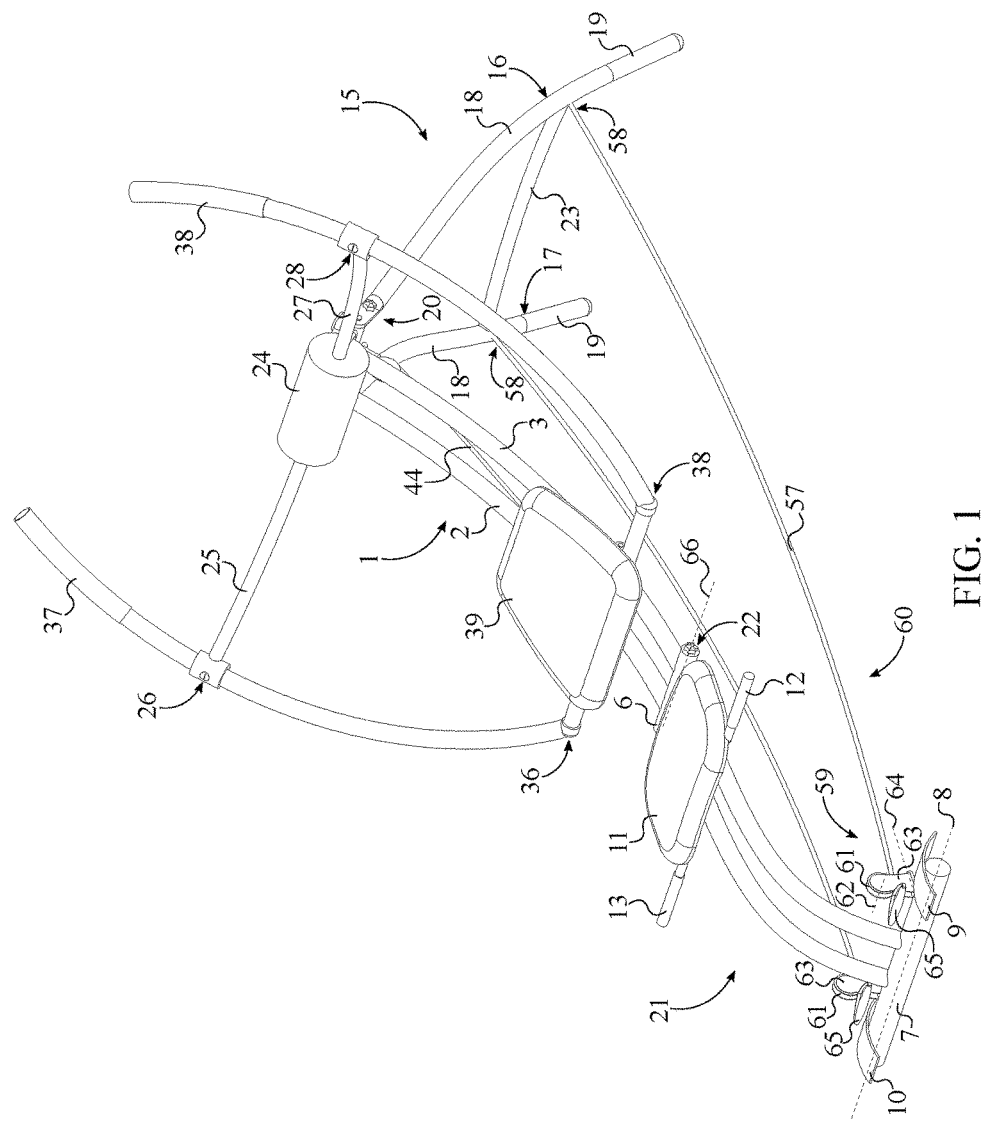
FIG. 1 is a perspective view of the present invention.
Figure 4:
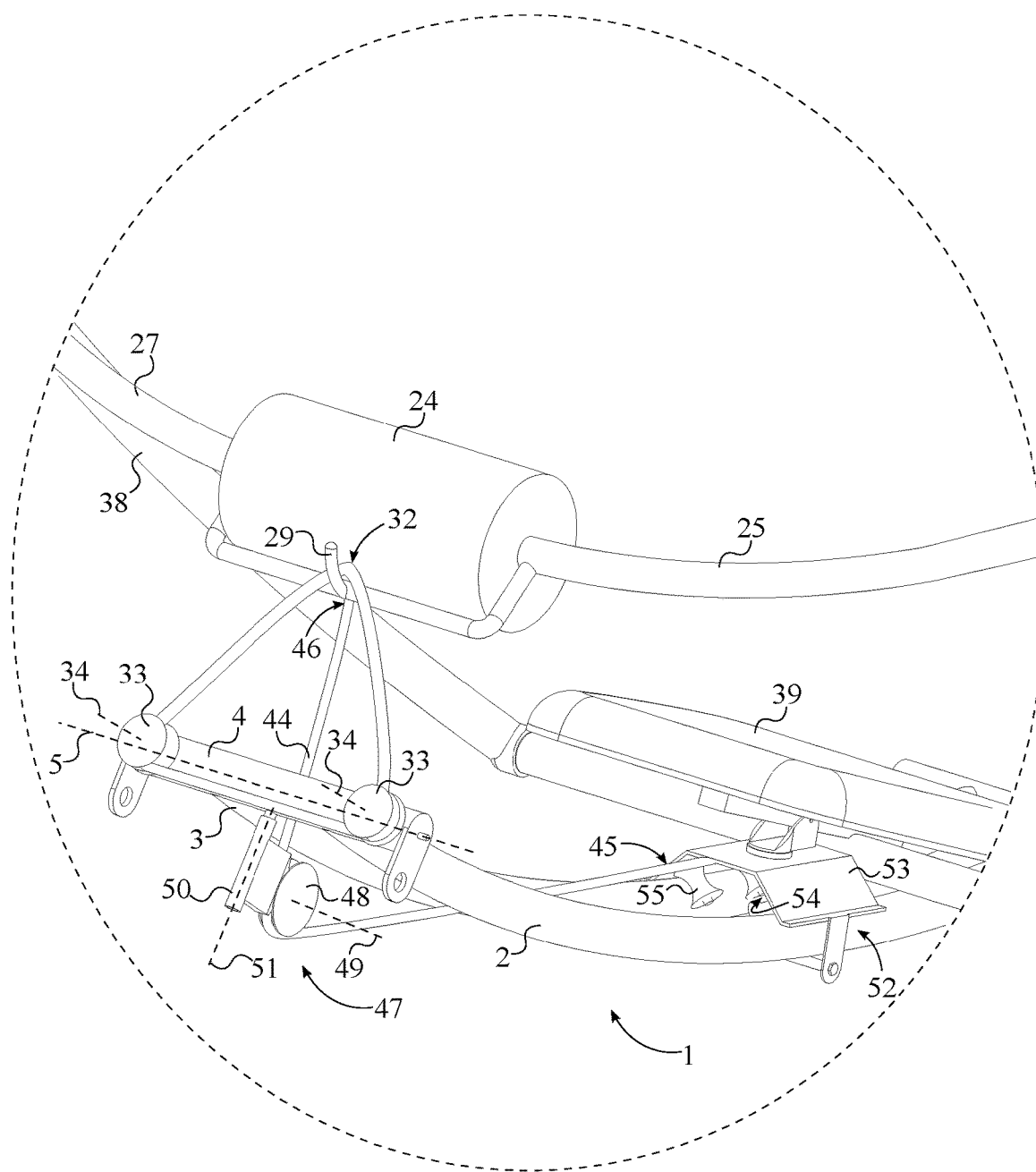
FIG. 4 is a further enlarged rear perspective view of the present invention.

Referring to FIG. 1, the present invention comprises an incline-adjustable frame 14, a track 1, a swiveling seat 11, a height-adjustable headrest 24, a first graspable pole 35, a second graspable pole 37, and a backrest 39. The incline-adjustable frame 14 acts as the support structure for the present invention and allows the user to raise or lower the angle of the track 1 for variable exercise difficulty. The track 1 provides a range of motion for various exercises that may be performed by the present invention. In particular, the track 1 provides a guide curve for the user to follow in order to engage various muscle groups such as the abdominal and core muscles. The track 1 may be curved or straight depending on the needs and preferences of the user. The track 1 is mounted onto the incline-adjustable frame 14 as seen in FIG. 4. The backrest 39 supports and guides the user along the track 1 while performing a crush-like exercise. This is achieved by the backrest 39 which is slidably mounted to the track 1, thus allowing the backrest 39 to fluidly translate forward and backwards on the track 1. The backrest 39 is preferably a cushioned rectangular extrusion that is sized to receive and engage a portion of the user's back. Additionally, it is preferred that the backrest 39 is capable of tilting and rotating relative to the track 1, thus providing the user with additional range of motion. For example, the tilting aspect allows the user to stretch the abdominal and core muscles to their full extent. The swiveling seat 11 provides vertical support for the user. The swiveling seat 11 is terminally mounted to the track 1 such that when the user is seated, the backrest 39 is directly next to the user. The swiveling seat 11 is preferably a cushioned component that is capable of spinning about a central axis. This allows the user to perform twist based exercises which target the oblique abdominal muscle group, similar to a rotating workout chair.

The first graspable pole 35, the second graspable pole 37 and the height-adjustable headrest 24 provide support for the head and arms of the user while performing exercises on the present invention. The first graspable pole 35 and the second graspable pole 37 act as the gripping elements for the user's hands and are positioned on either side of the track 1. In particular, the track 1 is positioned in between the first graspable pole 35 and the second graspable pole 37. The first graspable pole 35 and the second graspable pole 37 are each preferably an elongated and curved tubular extrusion with padded regions for the user's hands. A proximal end 36 of the first graspable pole 35 is adjacently and rotatably mounted to the backrest 39. Similarly, a proximal end 38 of the second graspable pole 37 is adjacently and rotatably mounted to the backrest 39. This allows for relative motion in between the first graspable pole 35, the second graspable pole 37, and the backrest 39. Additionally, this position allows the first graspable pole 35 and the second graspable pole 37 to directly position in reaching distance of the user's hands when he or she is leaning on the backrest 39 with their back. The height-adjustable headrest 24 provides support for the head of the user. The height-adjustable headrest 24 is positioned offset from the backrest 39 and is mounted in between the first graspable pole 35 and the second graspable pole 37. When the user leans on the backrest 39, the height-adjustable headrest 24 is positioned directly under the user's neck or head region. Traditional crunches, sit ups, and abdominal exercise equipment usually result in the user grabbing the back of his or her head during the exercise in order to compensate and cheat the exercise, thus applying unnecessary pressure onto the neck and back region. The height-adjustable headrest 24 prevents unnecessary pressure onto the neck and back region and, as a result, the height-adjustable headrest 24 prevents injuries and forces the user to engage the abdominal and core muscles.

In order to target and workout the abdominal and core muscles through the present invention, the user sits on the swiveling seat 11 with his or her back towards the backrest 39. Next, the user reclines onto the backrest 39 with his or her head resting on the height-adjustable headrest 24. The user then grabs the first graspable pole 35 and the second graspable pole 37. To perform the crunch-like exercise, the user places his or her legs onto the incline-adjustable frame 14 and pushes away from the incline-adjustable frame 14 in order simultaneously raise his or her body off of the swiveling seat 11 and slide the backrest 39 up the track 1. As the backrest 39 slides up the track 1, the user tilts the backrest 39, the first graspable pole 35, and the second graspable pole 37 forwards while simultaneously engaging/contracting the abdominal muscles in order to counteract the force created by the user's weight as a result of the height and angled orientation of the body. At this point, the user may return to the original position and repeat the motion. Alternatively, the user may perform a twisting motion towards either the left or right side in order to engage additional muscle groups before repeating the process.

Referring to FIG. 1, in the preferred embodiment of the present invention, the track 1 comprises a first curved rail 2, a second curved rail 3, a first crossbar 4, and a second crossbar 6. The first curved rail 2 and the second curved rail 3 are positioned parallel and offset from each other in order to support the backrest 39 vertically and laterally. This ensures that the user does not accidentally fall to either side of the track 1 when utilizing the present invention. It is preferred that a cross section of the first curved rail 2 and the second curved rail 3 is circular shaped as this design minimizes stress points. Although, alternative shapes and designs may be used for the first curved rail 2 and the second curved rail 3. The first crossbar 4 and the second crossbar 6 structurally connect the first curved rail 2 and the second curved rail 3. The first crossbar 4 and the second crossbar 6 are oriented parallel to each other and are positioned opposite to each other across the first curved rail 2. In particular, the first crossbar 4 is terminally connected to the first curved rail 2 and the second curved rail 3. Similarly, the second crossbar 6 is terminally connected to the first curved rail 2 and the second curved rail 3 as seen in FIG. 3.

Figure 3:
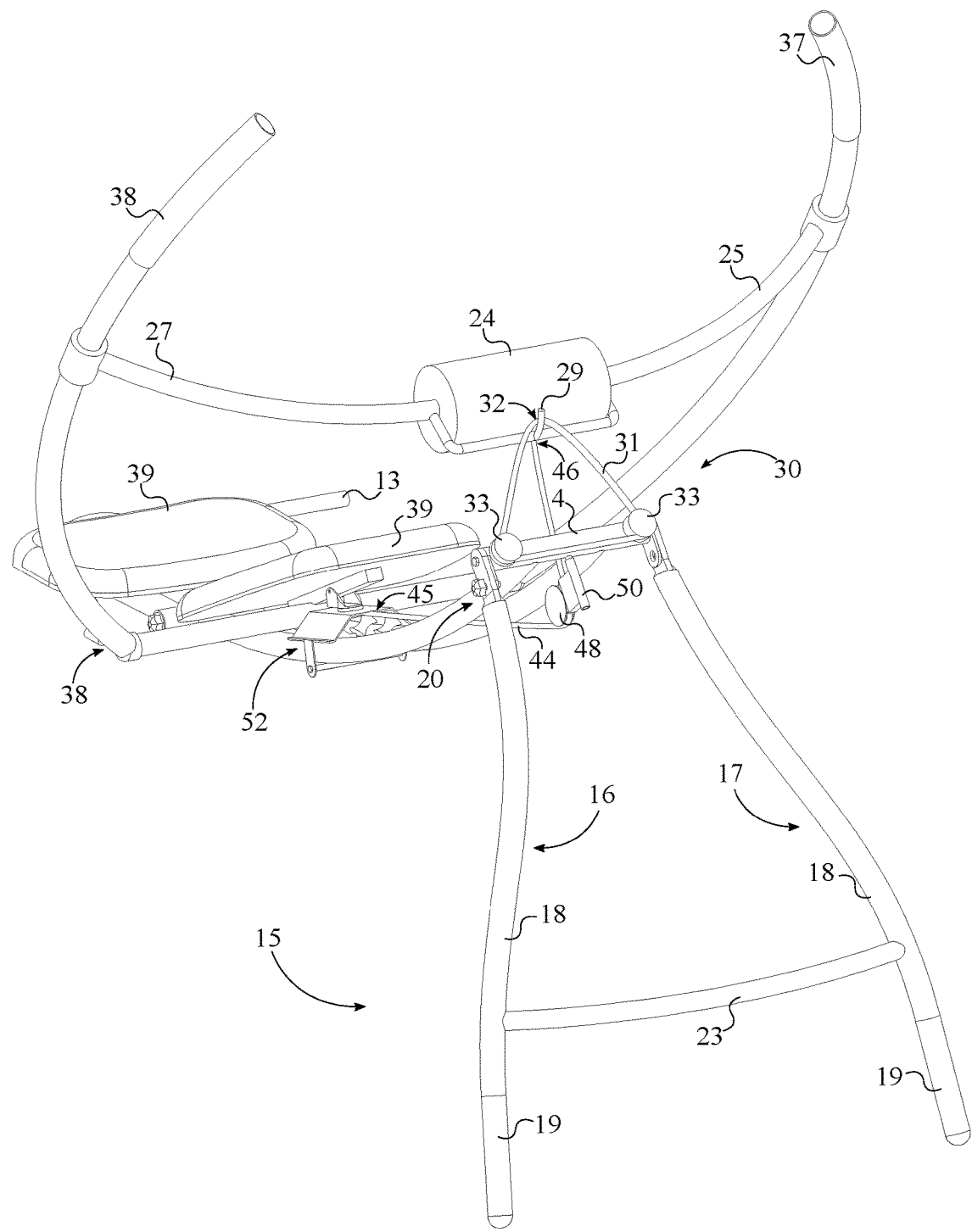
FIG. 3 is an enlarged rear perspective view of the present invention.

Referring to FIG. 3, the backrest 39 is slidably mounted along the track 1 by a sliding carriage 52. The sliding carriage 52 comprises a U-shaped bracket 53 and an at least one roller 55. The U-shaped bracket 53 connects the roller 55 to the backrest 39. The roller 55 is positioned within a gap 54 of the U-shaped bracket 53 and is rotatably mounted to the U-shaped bracket 53. The U-shaped bracket 53 is positioned such that the track 1 is within the gap 54 of the U-shaped bracket 53, adjacent to the roller 55. More specifically, the roller 55 is slidably engaged with the track 1. As a result, this allows the U-shaped bracket 53 and anything attached to the U-shaped bracket 53, to move up and down the track 1. The backrest 39 is pivotably connected to the U-shaped bracket 53, opposite the roller 55. The pivot connection may be accomplished through a variety of mechanisms in order to allow the backrest 39 to rotate and tilt relative to the sliding carriage 52.

Referring to FIG. 4, in one embodiment of the present invention, the at least one roller 55 includes four rollers 55. In this embodiment, two rollers 55 are rotatably connected to either leg of the U-shaped bracket 53 with each roller 55 being sized complimentary to the first curved rail 2 and the second curved rail 3. In order to prevent the sliding carriage 52 from easily disengaging from the track 1, the legs of the U-shaped bracket 53 are angled at 45-degrees and are oriented away from each other. A physical barrier may also be used to further ensure that the sliding carriage 52 does not disengage from the track 1. More specifically, a restrain bar may be used. The restraint bar is positioned adjacent to the track 1, opposite the roller 55, and is mounted to the U-shaped bracket 53. A variety of different designs and mechanisms may be used for the sliding carriage 52 as well. In another embodiment of the present invention, the sliding carriage 52 comprises a single elongated roller 55 that spans the gap 54 of the U-shaped bracket 53 and is rotatably mounted to both legs of the U-shaped bracket 53. In this embodiment, said roller 55 slidably engages both the first curved rail 2 and the second curved rail 3.

Referring to FIG. 1, the height-adjustable headrest 24 is mounted to the first graspable pole 35 and the second graspable pole 37 by a first headrest bar 25, a second headrest bar 27, a first locking mechanism 26, and a second locking mechanism 28. The first headrest bar 25 and the second headrest bar 27 are elongated tubular structures that are positioned opposite of each other across the height-adjustable headrest 24. The first headrest bar 25 is adjacently connected to the height-adjustable headrest 24 at a first end of the first headrest bar 25. A second end of the first headrest bar 25 is slidably attached to the first graspable pole 35. The first headrest bar 25 is secured to the first graspable pole 35 by the first locking mechanism 26. The first locking mechanism 26 is mechanically integrated in between the first graspable pole 35 and the first headrest bar 25 in order to affix the first headrest bar 25 to a desired setting. Similarly, the second headrest bar 27 is adjacently connected to the height-adjustable headrest 24 at a first end of the second headrest bar 27. A second end of the second headrest bar 27 is slidably attached to the second graspable pole 37. The second headrest bar 27 is secured to the second graspable pole 37 by the second locking mechanism 28. The second locking mechanism 28 is mechanically integrated in between the second graspable pole 37 and the second headrest bar 27. The first locking mechanism 26 and the second locking mechanism 28 allow the user to vary and adjust the position of the height-adjustable headrest 24 relative to the backrest 39 in order to accommodate users of different heights. In one embodiment of the present invention, the first locking mechanism 26 and the second locking mechanism 28 are each a screw clamp. Although, a variety of alternative mechanisms may be used instead.

The present invention utilizes a second resistance band 44 and a return pulley assembly 47 to aid the user in performing the crunch-like exercise. The second resistance band 44 and the return pulley assembly 47 serve two main functions. The first function is to allow the user to use his or her arms in order to perform the crunch-like exercise. The second function is to return the height-adjustable headrest 24 directly next to the first crossbar 4 after each individual rep. The return pulley assembly 47 comprises a second pulley 48 and a first support bracket 50. The return pulley assembly 47 runs the first resistance band 31 by the first crossbar 4. The return pulley assembly 47 is positioned in between the first curved rail 2 and the second curved rail 3. The first support bracket 50 is rotatably mounted to the first crossbar 4 in order to extend and support the second pulley 48 at an offset distance from the first crossbar 4. The second pulley 48 is rotatably mounted to the first support bracket 50 with a rotation axis 49 of the second pulley 48 being oriented perpendicular to a central axis 5 of the first crossbar 4. The second resistance band 44 couples the backrest 39 to the height-adjustable headrest 24 through the return pulley assembly 47. More specifically, a first end 45 of the second resistance band 44 is fixed to the backrest 39, the sliding carriage 52 to be exact. A second end 46 of the second resistance band 44 is fixed to the height-adjustable headrest 24. Furthermore, the second resistance band 44 is tensionably engaged to the second pulley 48. As a result, when the user pushes the first graspable pole 35 and the second graspable pole 37 forwards while performing the crunch-like exercise, the height-adjustable headrest 24 pulls on the second resistance band 44 and pulls the backrest 39 up the track 1. When the backrest 39 is slid down the track 1, the second resistance band 44 pulls the height-adjustable headrest 24 towards the return pulley assembly 47 and thus the first crossbar 4. This is especially useful when the user choses to rotate his or her body to the left or right of the track 1 during the crunch-like exercise as the second resistance band 44 pulls the user back to the track 1, resulting in a smooth transition in between reps.

The incline-adjustable frame 14 comprises a first pair of foldable legs 15, a second pair of foldable legs 21, a first locking hinge 20, and a second locking hinge 22. The first pair of foldable legs 15 and the second pair of foldable legs 21 support the present invention and are positioned opposite to each other along the track 1. More specifically, the first pair of foldable legs 15 is pivotably connected to the first crossbar 4 about the central axis 5 of the first crossbar 4. As a result, the first pair of foldable legs 15 may be positioned extending away from the track 1 and directly adjacent to the track 1. In the extended state, the first pair of foldable legs 15 supports the present invention. In the folded state, the first pair of foldable legs 15 reduces the overall dimensions of the present invention, ideal for storage purposes. The first pair of foldable legs 15 is locked in place by the first locking hinge 20. The first locking hinge 20 is mechanically integrated in between the first pair of foldable legs 15 and the first crossbar 4. The preferred mechanism for the first locking hinge 20 is a locking pin which traverses through both the first pair of foldable legs 15 and the first crossbar 4 in order to secure the two components at a specific configuration.

In the preferred embodiment of the present invention, the first pair of foldable legs 15 is also height adjustable. This allows the user to vary the angle orientation of the track 1 and therefore vary the difficulty of the crunch-like exercise and other similar exercises performed on the present invention. A first leg 16 of the first pair of foldable legs 15 and a second leg 17 of the first pair of foldable legs 15 each comprise an upper tubular portion 18 and a lower tubular portion 19. The upper tubular portion 18 is positioned adjacent to the first crossbar 4. The lower tubular portion 19 is telescopically engaged into the upper tubular portion 18, opposite the first crossbar 4. This allows for the total length of the first leg 16 and the second leg 17 to vary. The telescopic connection is preferably achieved through a slot-and-pin mechanism, although alternative mechanisms may also be utilized. For additional structural integrity during operation, the present invention also comprises a lateral support bar 23. The lateral support bar 23 is connected in between the upper tubular portion 18 of the first leg 16 and the upper tubular portion 18 of the second leg 17.

Similarly, the second pair of foldable legs 21 is pivotably connected to the second crossbar 6 about a central axis 66 of the second crossbar 6. As a result, the second pair of foldable legs 21 may be positioned extending away from the track 1 and directly adjacent to the track 1. In the extended state, the second pair of foldable legs 21 supports the present invention. In particular, the second pair of foldable legs 21 supports the swiveling seat 11; the swiveling seat 11 is adjacently and rotatably connected to the second pair of foldable legs 21, adjacent to the track 1. In the folded state, the second pair of foldable legs 21 reduces the overall dimensions of the present invention, ideal for storage purposes. The second pair of foldable legs 21 is locked in place by the second locking hinge 22. The second locking hinge 22 is mechanically integrated in between the second pair of foldable legs 21 and the second crossbar 6. The preferred mechanism for the second locking hinge 22 is a locking pin which traverses through both the second pair of foldable legs 21 and the second crossbar 6 in order to secure the two components at a specific configuration.

Referring to FIG. 3, attached to the second pair of foldable legs 21 is a first foot pedal 9 and a second foot pedal 10. This is achieved with a third crossbar 7. The third crossbar 7 provides structural support for the second pair of foldable legs 21 and supports the first foot pedal 9 and the second foot pedal 10. In particular, the third crossbar 7 is positioned adjacent to the second pair of foldable legs 21, opposite the track 1. The third crossbar 7 is terminally connected to the second pair of foldable legs 21 in order to directly engage the floor when the present invention is utilized. The first foot pedal 9 and the second foot pedal 10 are positioned opposite to each other across the second pair of foldable legs 21 in order to receive either foot of the user. The first foot pedal 9 is rotatably connected to the third crossbar 7 about a central axis 8 of the third crossbar 7. Similarly, the second foot pedal 10 is rotatably connected to the third crossbar 7 about the central axis 8 of the third crossbar 7. This allows the first foot pedal 9 and the second foot pedal 10 to tilt forwards and backwards. The first foot pedal 9 and the second foot pedal 10 receive and support the user's feet during the crunch-like exercise; the user pushes off the first foot pedal 9 and the second foot pedal 10 in order to push the backrest 39 up the track 1. It is important that the user pushes off the first foot pedal 9 and the second foot pedal 10 as pushing off the ground can move/translate the whole apparatus across the floor that it is standing on. The first foot pedal 9 and the second foot pedal 10 may contain rubberized and ridges surfaces in order to prevent slippage of the user's feet during operation of the present invention.

Figure 2:
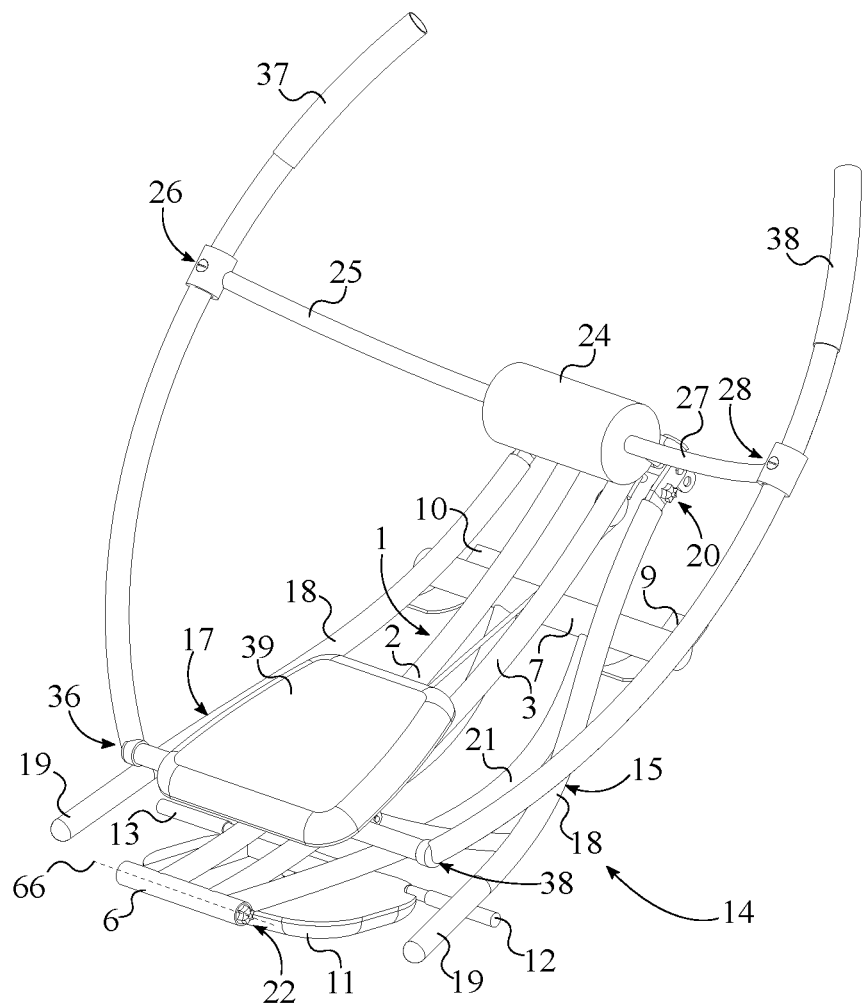
FIG. 2 is a perspective view of the present invention configured into a collapsed configuration.

Referring to FIG. 2, the pivot axis of the first pair of foldable legs 15 is positioned parallel to the pivot axis of the second pair of foldable legs 21 in order to allow the present invention, the incline adjustable frame and the track 1, to be configured into a collapsed configuration. In the collapsed configuration, the first pair of foldable legs 15 is positioned adjacent to the track 1, opposite the backrest 39. Additionally, the second pair of foldable legs 21 is positioned adjacent to the first pair of foldable legs 15, opposite the track 1. As a result, the overall dimensions of the present invention are significantly reduced, thus allowing the user to easily handle and store the present invention.

Referring to FIG. 4, the present invention also includes a means for increasing the resistance for the user executing the crunch-like exercise. In particular, the present invention further comprises a hook 29 and an at least one resistance module 30. The hook 29 is a curved structure that is positioned in between the height-adjustable headrest 24 and is adjacently connected to the height-adjustable headrest 24. The hook 29 acts as an anchor point for the height-adjustable headrest 24 and allows for the attachment of weights or resistance bands to the height-adjustable headrest 24, thus adding a downward force onto the height-adjustable headrest 24, the first graspable pole 35, and the second graspable pole 37. As a result, the added downward force resists the crunch-like exercise motion described above. The resistance module 30 provides the aforementioned downward force and comprises a first resistance band 31 and a pair of first pulleys 33. The pair of first pulleys 33 act as an anchor point on the track 1 for the first resistance band 31. The pair of first pulleys 33 is positioned adjacent to the first crossbar 4, opposite the first curved rail 2 and the second curved rail 3. In particular, the pair of first pulleys 33 is rotatably connected to the first crossbar 4 with a rotation axis 34 for each pully of the pair of first pulleys 33 being oriented perpendicular to the central axis 5 of the first crossbar 4. In order to increase the resistance, the first resistance band 31 is positioned tensionably engaging the pair of first pulleys 33 with a specific portion 32 of the first resistance band 31 being attached to the hook 29. This increases the difficulty of the crunch-like exercise as now the user must overcome the additional resistance force produced by the first resistance band 31. The pair of first pulleys 33 allows the first resistance band 31 to follow the height-adjustable headrest 24 along lateral paths with little to no friction losses and rubbing in relation to the first resistance band 31 and the ridges and corners directly around the first resistance band 31. This increases the longevity of the resistance module 30 and thus the present invention. In alternative embodiments, more than one resistance module 30 may be utilized. For these embodiments, the resistance modules 30 are positioned in series with each other wherein the pair of first pulleys 33 of one resistance module 30 is mounted on top of the pair of first pulleys 33 of an adjacent resistance module 30.

Figure 5:
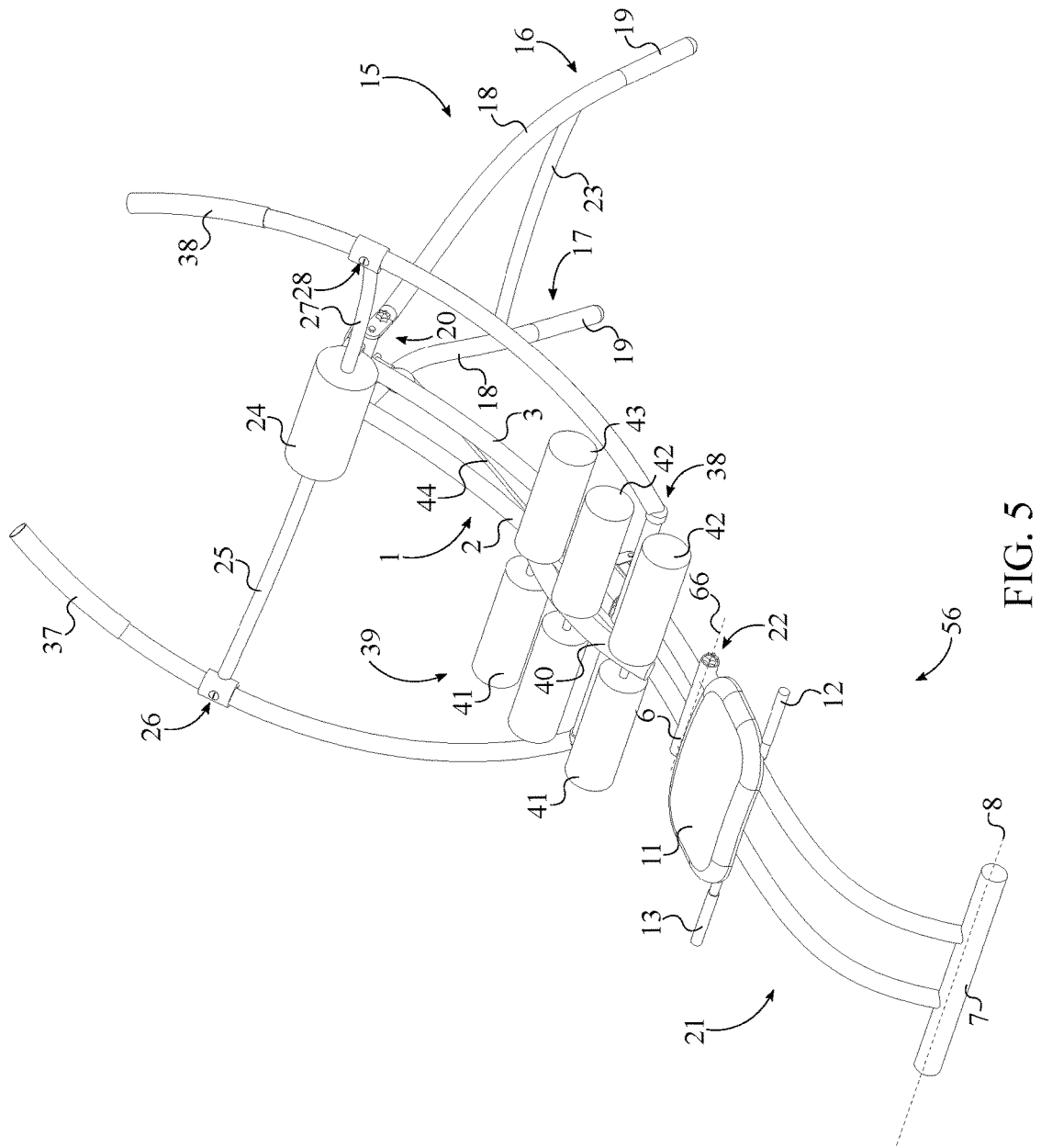
FIG. 5 is a perspective view of an alternative embodiment of the present invention.

Referring to FIG. 5, in one embodiment of the present invention, the backrest 39 comprises a curved tubular frame 40, a first plurality of rolling supports 41, and a second plurality of rolling supports 42. The curved tubular frame 40 supports and connects the first plurality of rolling supports 41 and the second plurality of rolling supports 42 to the sliding carriage 52. The first plurality of rolling supports 41 and the second plurality of rolling supports 42 are both used to evenly distribute the weight of the user along the curved tubular frame 40. The first plurality of rolling supports 41 is laterally mounted to the curved tubular frame 40. Similarly, the second plurality of rolling supports 42 is laterally mounted to the curved tubular frame 40, opposite the first plurality of rolling supports 41. This yields a symmetric design for the backrest 39, thus providing even support for the left and right side of the user's back. The first plurality of rolling supports 41 and the second plurality of rolling supports 42 are distributed along the curved tubular frame 40. This helps to maximize comfort and support for the user. Each of the first plurality of rolling supports 41 is positioned adjacent to a corresponding roller 43 from the second plurality of rolling supports 42 to further ensure equal support for the user's back. As the user exercises with the present invention, each support from the first plurality of rolling supports 41 and second plurality of rolling supports 42 is able to rotate, allowing the user to move unimpeded. The curved tubular frame 40 is pivotably mounted to the sliding carriage 52, opposite the track 1. As a result, the user is able to perform various exercises with the present invention.

To further increase the versatility, in one embodiment, the present invention further comprises a first handlebar 12, a second handlebar 13, a third handlebar and a fourth handlebar. The first handlebar 12 and the second handlebar 13 provide grasping elements for the user for exercises performed utilizing the swiveling seat 11. One possible exercise is leg raises, wherein the user raises and lowers his or her legs while sitting upright on the swiveling seat 11. The first handlebar 12 and the second handlebar 13 are positioned opposite to each other across the swiveling seat 11. The first handlebar 12 is adjacently connected to the swiveling seat 11. Similarly, the second handlebar 13 is adjacently connected to the swiveling seat 11. The first handlebar 12 and the second handlebar 13 are preferably extending away from the swiveling seat 11 as seen in FIG. 1.

The third handlebar and the fourth handlebar provide the user additional stability when utilizing the present invention in order to target the lateral muscle groups of the middle section. The third handlebar is laterally connected about the first headrest bar 25 and is positioned adjacent to the first graspable pole 35. Similarly, the fourth handlebar is laterally connected about the second headrest bar 27 and is positioned adjacent to the second graspable pole 37. It is preferred that the third handlebar and the fourth handlebar are cushioned and contain ridges that compliments the contours of the human hand in order to yield a more ergonomic design. The third handlebar and the fourth handlebar are both utilized for exercises where the user places his or her knees on the swiveling seat 11 and then turns left and right to engage the oblique muscle groups. During this exercise, the user stabilizes himself or herself by holding on to the third handlebar and the fourth handlebar.

Referring to FIG. 1, the present invention may also comprise an at least one band-pulley exercise module 56. The band-pulley exercise module 56 allows the user to perform a variety of exercises utilizing band anchored to present invention and thus comprises a third resistance band 57, an exercise pulley assembly 60, and a hand grip 65. The third resistance band 57 is an elongated elastic band that is used to create and apply a specific force onto various muscle groups of the user. The exercise pulley assembly 60 guides the third resistance band 57 during various exercises with the band-pulley exercise module 56. The exercise pulley assembly 60 is positioned adjacent to the third crossbar 7 and comprises a third pulley 61 and a second support bracket 63. The second support bracket 63 is rotatably mounted to the third crossbar 7 and provides the exercise pulley assembly 60 with a first rotation axis. The third pulley 61 is rotatably mounted to the second support bracket 63 in order to guide the third resistance band 57 through the exercise pulley assembly 60 and act as a pivot point for the third resistance band 57. A rotation axis 62 of the third pulley 61 is oriented perpendicular to a rotation axis 64 of the second support bracket 63. A first end 58 of the third resistance band 57 is fixed to the first pair of foldable legs 15. A second end 59 of the third resistance band 57 is fixed to the handle grip. The handle grip is used as a grasping element for the user and is positioned adjacent to the exercise pulley assembly 60, opposite the first pair of foldable legs 15, with the third resistance band 57 being tensionably engaged to the third pulley 61. This allows the user to perform various exercises while standing on the first foot pedal 9 and the second foot pedal 10.

In yet another embodiment of the present invention, the incline-adjustable frame 14 comprises two rocking legs which allow the whole apparatus to rock forwards and backwards. In this embodiment, the user utilizes the present invention by performing the crunch-like exercise while rocking the whole apparatus forwards and backwards. A rolling wheel in conjunction with an elastic band may also be utilized to return the present invention into a vertical orientation.

Although the invention has been explained in relation to its preferred embodiment, it is to be understood that many other possible modifications and variations can be made without departing from the spirit and scope of the invention as hereinafter claimed.

What is claimed is:

1. A multi-purpose abdominal and core exercise machine comprises:
   an incline-adjustable frame;
   a track;
   a swiveling seat;
   a height-adjustable headrest;
   a first graspable pole;
   a second graspable pole;
   a backrest;
   the track being mounted onto the incline-adjustable frame;
   the backrest being slidably mounted along the track;
   the swiveling seat being terminally mounted to the track;
   the track being positioned in between the first grasping pole and the second graspable pole;
   a proximal end of the first graspable pole being adjacently and rotatably mounted to the backrest;
   a proximal end of the second graspable pole being adjacently and rotatably mounted to the backrest;
   the height-adjustable headrest being positioned offset from the backrest; and
   the height-adjustable headrest being mounted in between the first graspable pole and the second graspable pole.

2. The multi-purpose abdominal and core exercise machine as claimed in claim 1 comprises:
   the track comprises a first curved rail, a second curved rail, a first crossbar, and a second crossbar;
   the first curved rail and the second curved rail being positioned parallel and offset from each other;
   the first crossbar and the second crossbar being positioned opposite to each other along the first curved rail;
   the first crossbar being and the second crossbar being oriented parallel to each other;
   the first crossbar being terminally connected to the first curved rail and the second curved rail; and
   the second crossbar being terminally connected to the first curved rail and the second curved rail.

3. The multi-purpose abdominal and core exercise machine as claimed in claim 2 comprises:
   a hook;
   an at least one resistance module;
   the resistance module comprises a first resistance band and a pair of first pulleys;
   the hook is positioned in between the height-adjustable headrest and the track;
   the hook being adjacently connected to the height-adjustable headrest;
   the pair of first pulleys being positioned adjacent to the first crossbar, opposite the first curved rail and the second curved rail;
   the pair of first pulleys being rotatably connected to the first crossbar;
   a rotation axis for each of the pair of first pulleys being oriented perpendicular to a central axis of the first crossbar;
   the first resistance band being tensionably engaged to the pair of first pulleys; and
   a specific portion of the first resistance band being attached to the hook.

4. The multi-purpose abdominal and core exercise machine as claimed in claim 2 comprises:
   a second resistance band;
   a return pulley assembly;
   the return pulley assembly comprises a second pulley and a first support bracket;
   the return pulley assembly being positioned in between the first curved rail and the second curved rail;
   the first support bracket being rotatably mounted to the first crossbar;
   the second pulley being rotatably mounted to the first support bracket;
   a rotation axis of the second pulley being oriented perpendicular to a rotation axis of the first support bracket;
   a first end of the second resistance band being fixed to the backrest;
   a second end of the second resistance band being fixed to the height-adjustable headrest; and
   the second resistance band tensionably engaging the second pulley.

5. The multi-purpose abdominal and core exercise machine as claimed in claim 1 comprises:
   a first handlebar;
   a second handlebar;
   the first handlebar and the second handlebar being positioned opposite to each other across the swiveling seat;
   the first handlebar being adjacently connected to the swiveling seat; and
   the second handlebar being adjacently connected to the swiveling seat.

6. The multi-purpose abdominal and core exercise machine as claimed in claim 1 comprises:
   a sliding carriage;
   the sliding carriage comprises a U-shaped bracket and an at least one roller;
   the roller being positioned within a gap of the U-shaped bracket;
   the roller being rotatably mounted to the U-shaped bracket;
   the track being positioned within the gap of the U-shaped bracket, adjacent to the roller;
   the roller being slidably engaged with the track;
   the backrest being pivotably connected to the U-shaped bracket, opposite the roller; and
   the backrest being slidably mounted along the track by the sliding carriage.

7. The multi-purpose abdominal and core exercise machine as claimed in claim 1 comprises:
   the incline-adjustable frame comprises a first pair of foldable legs, a second pair of foldable legs, a first locking hinge, and a second locking hinge;

the first pair of foldable legs and the second pair of foldable legs being positioned opposite to each other along the track;

the first pair of foldable legs being pivotably connected to a first crossbar of the track about a central axis of the first crossbar;

the first locking hinge being mechanically integrated in between the first pair of foldable legs and the first crossbar;

the second pair of foldable legs being pivotably connected to a second crossbar of the track about a central axis of the second crossbar;

the second locking hinge being mechanically integrated in between the second pair of foldable legs and the second crossbar; and the swiveling seat being adjacently and rotatably connected to the second pair of foldable legs, adjacent to the track.

8. The multi-purpose abdominal and core exercise machine as claimed in claim 7 comprises:
a lateral support bar;
a first leg from the first pair of foldable legs and a second leg from the first pair of foldable legs each comprise an upper tubular portion and a lower tubular portion;
the upper tubular portion being positioned adjacent to the first crossbar;
the lower tubular portion being telescopically engaged into the upper tubular portion, opposite the first crossbar; and
the lateral support bar being connected in between the upper tubular portion of the first leg and the upper tubular portion of the second leg.

9. The multi-purpose abdominal and core exercise machine as claimed in claim 7 comprises:
a third crossbar;
a first foot pedal;
a second foot pedal;
the third crossbar being positioned adjacent to the second pair of foldable legs, opposite the track;
the third crossbar being oriented parallel to the second crossbar;
the third crossbar being terminally connected to the second pair of foldable legs;
the first foot pedal and the second foot pedal being positioned opposite to each other across the second pair of foldable legs;
the first foot pedal being rotatably connected to the third crossbar about a central axis of the third crossbar; and
the second foot pedal being rotatably connected to the third crossbar about the central axis of the third crossbar.

10. The multi-purpose abdominal and core exercise machine as claimed in claim 7 comprises:
wherein the incline-adjustable frame and the track are configured into a collapsed configuration;
the first pair of foldable legs being positioned adjacent to the track, opposite the backrest; and
the second pair of foldable legs being positioned adjacent to the first pair of foldable legs, opposite the track.

11. The multi-purpose abdominal and core exercise machine as claimed in claim 7 comprises:
a third crossbar;
an at least one band-pulley exercise module;
the third crossbar being positioned adjacent to the second pair of foldable legs, opposite the track;

the third crossbar being oriented parallel to the second crossbar;
the third crossbar being terminally connected to the second pair of foldable legs;
the exercise module comprises a third resistance band, an exercise pulley assembly, and a hand grip;
the exercise pulley assembly comprises a third pulley and a second support bracket;
the exercise pulley assembly being positioned adjacent to a third crossbar;
the second support bracket being rotatably mounted to the third crossbar;
the third pulley being rotatably mounted to the second support bracket;
a rotation axis of the third pulley being oriented perpendicular to a rotation axis of the second support bracket;
a first end of the third resistance band being fixed to the first pair of foldable legs;
a second end of the third resistance band being fixed to the hand grip;
the third resistance band being tensionably engaged to the third pulley; and
the hand grip being positioned adjacent to the exercise pulley assembly, opposite the first pair of foldable legs.

12. The multi-purpose abdominal and core exercise machine as claimed in claim 1 comprises:
a first headrest bar;
a second headrest bar;
a first locking mechanism;
a second locking mechanism;
the first headrest bar and the second headrest bar being positioned opposite of each other across the height-adjustable headrest;
the first headrest bar being adjacently connected to the height-adjustable headrest;
the first headrest bar being slidably attached to the first graspable pole;
the first locking mechanism being mechanically integrated in between the first graspable pole and the first headrest bar;
the second headrest bar being adjacently connected to the height-adjustable headrest;
the second headrest bar being slidably attached to the second graspable pole; and
the second locking mechanism being mechanically integrated in between the second graspable pole and the second headrest bar.

13. The multi-purpose abdominal and core exercise machine as claimed in claim 1 comprises:
the backrest comprises a curved tubular frame, a first plurality of rolling supports, and a second plurality of rolling supports;
the first plurality of rolling supports being laterally mounted to the curved tubular frame;
the second plurality of rolling supports being laterally mounted to the curved tubular frame, opposite to the first plurality of rolling supports;
the first plurality of rolling supports and the second plurality of rolling supports being distributed along the curved tubular frame;
each of the first plurality of rolling supports being positioned adjacent to a corresponding roller from the second plurality of rolling supports; and
the curved tubular frame being pivotably mounted to a sliding carriage, opposite the track.

* * * * *